United States Patent
Schwarz et al.

(10) Patent No.: US 10,464,694 B1
(45) Date of Patent: Nov. 5, 2019

(54) ASYMMETRIC THRUSTER GIMBAL CONFIGURATION

(71) Applicant: Space Systems/Loral, LLC, Palo Alto, CA (US)

(72) Inventors: Robert Erik Schwarz, Redwood Estates, CA (US); Jason J. Chiang, Fremont, CA (US); Xenophon H. Price, Redwood City, CA (US); Darren R. Stratemeier, Mountain View, CA (US); Eric V. Werner, Mountain View, CA (US)

(73) Assignee: Space Systems/Loral, LLC, Palo Alto, CA (US)

(*) Notice: Subject to any disclaimer, the term of this patent is extended or adjusted under 35 U.S.C. 154(b) by 368 days.

(21) Appl. No.: 15/467,612

(22) Filed: Mar. 23, 2017

(51) Int. Cl.
   *B64G 1/00* (2006.01)
   *B64G 1/24* (2006.01)

(52) U.S. Cl.
   CPC .............. *B64G 1/007* (2013.01); *B64G 1/242* (2013.01)

(58) Field of Classification Search
   CPC .......... B64G 1/007; B64G 1/242; B64G 1/26; F02K 9/84
   See application file for complete search history.

(56) References Cited

U.S. PATENT DOCUMENTS

| 4,767,084 | A |   | 8/1988  | Chan et al. |
| 5,349,532 | A | * | 9/1994  | Tilley ....................... B64G 1/26 244/164 |
| 5,595,360 | A |   | 1/1997  | Spitzer |
| 5,810,295 | A |   | 9/1998  | Anzel |
| 5,813,043 | A |   | 9/1998  | Iles et al. |
| 5,984,236 | A |   | 11/1999 | Keitel et al. |
| 6,032,904 | A |   | 3/2000  | Hosick et al. |
| 6,116,543 | A |   | 9/2000  | Koppel |
| 6,260,805 | B1 |  | 7/2001  | Yocum, Jr. et al. |
| 6,296,207 | B1 |  | 10/2001 | Tilley et al. |

(Continued)

FOREIGN PATENT DOCUMENTS

| EP | 1099093 A1 | * | 5/2001 | ............... B64G 1/28 |
| EP | 1099093 A1 |   | 5/2001 | |

(Continued)

*Primary Examiner* — Philip J Bonzell
*Assistant Examiner* — Alexander V. Giczy
(74) *Attorney, Agent, or Firm* — Weaver Austin Villeneuve & Sampson LLP

(57) ABSTRACT

A spacecraft includes at least a first thruster support mechanism (TSM) and a second TSM, each TSM including a pointing arrangement, an elongated structural member and thruster for performing orbit raising north-south stationkeeping, east-west stationkeeping, and momentum management. A first pointing arrangement is articulable only by way of first and second revolute joints, the first revolute joint being rotatable about a first axis fixed with respect to the spacecraft. The second pointing arrangement is articulable only by way of third and fourth revolute joints, the third revolute joint being rotatable about a third axis fixed with respect to the spacecraft. The first axis and the third axis are asymmetrically arranged with respect to a spacecraft coordinate system origin such that the first and third axis are at acute angles to a spacecraft pitch axis and the acute angle of the first axis is less than that of the third axis.

20 Claims, 8 Drawing Sheets

(56) References Cited

U.S. PATENT DOCUMENTS

| | | | |
|---|---|---|---|
| 6,543,723 B1 | 4/2003 | Oh | |
| 6,565,043 B1 | 5/2003 | Wittmann | |
| 7,113,851 B1 | 9/2006 | Gelon et al. | |
| 8,763,957 B1 | 7/2014 | Higham et al. | |
| 8,998,146 B2 | 4/2015 | Woo et al. | |
| 9,108,749 B2 | 8/2015 | Woo et al. | |
| 9,296,494 B1 | 3/2016 | Campbell et al. | |
| 9,387,942 B2 | 7/2016 | Celerier | |
| 9,527,607 B2 | 12/2016 | Celerier | |
| 2007/0029446 A1 | 2/2007 | Mosher et al. | |
| 2009/0166476 A1* | 7/2009 | Termini | B64G 1/1078 244/158.6 |
| 2013/0313369 A1 | 11/2013 | Celerier | |
| 2014/0138491 A1* | 5/2014 | Woo | B64G 1/26 244/165 |
| 2016/0167810 A1 | 6/2016 | Janu et al. | |
| 2016/0176545 A1 | 6/2016 | Munir et al. | |
| 2017/0283094 A1* | 10/2017 | Ho | B64G 1/242 |
| 2018/0148197 A1* | 5/2018 | Halsband | B64G 1/1078 |
| 2018/0155064 A1* | 6/2018 | Haertel | B64G 1/405 |

FOREIGN PATENT DOCUMENTS

| | | | | |
|---|---|---|---|---|
| GB | 2056392 A | * | 3/1981 | B64G 1/26 |
| WO | WO-0005549 A1 | * | 2/2000 | B64G 1/28 |

* cited by examiner

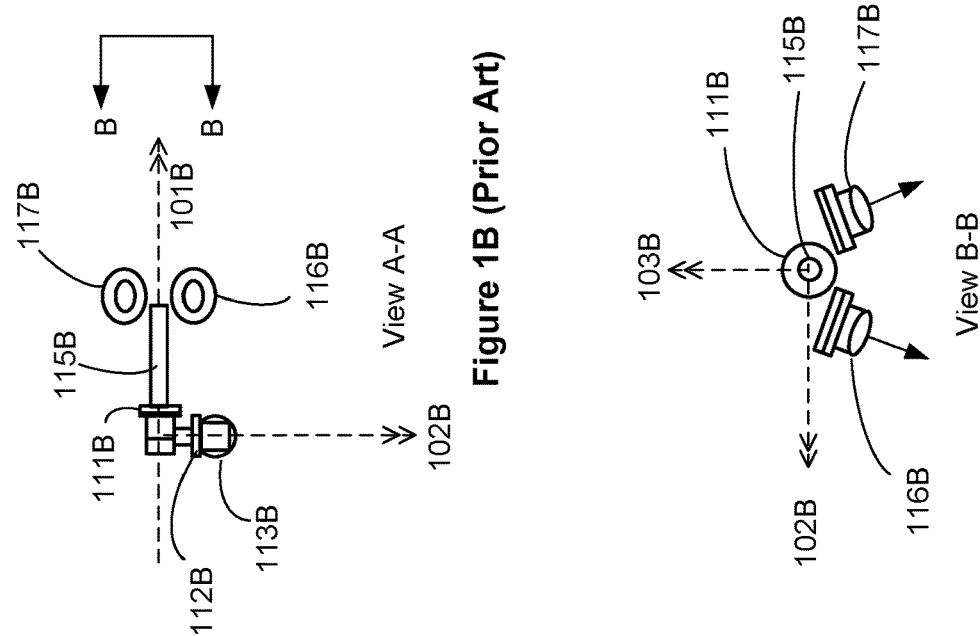
Figure 1B (Prior Art)
Figure 1C (Prior Art)
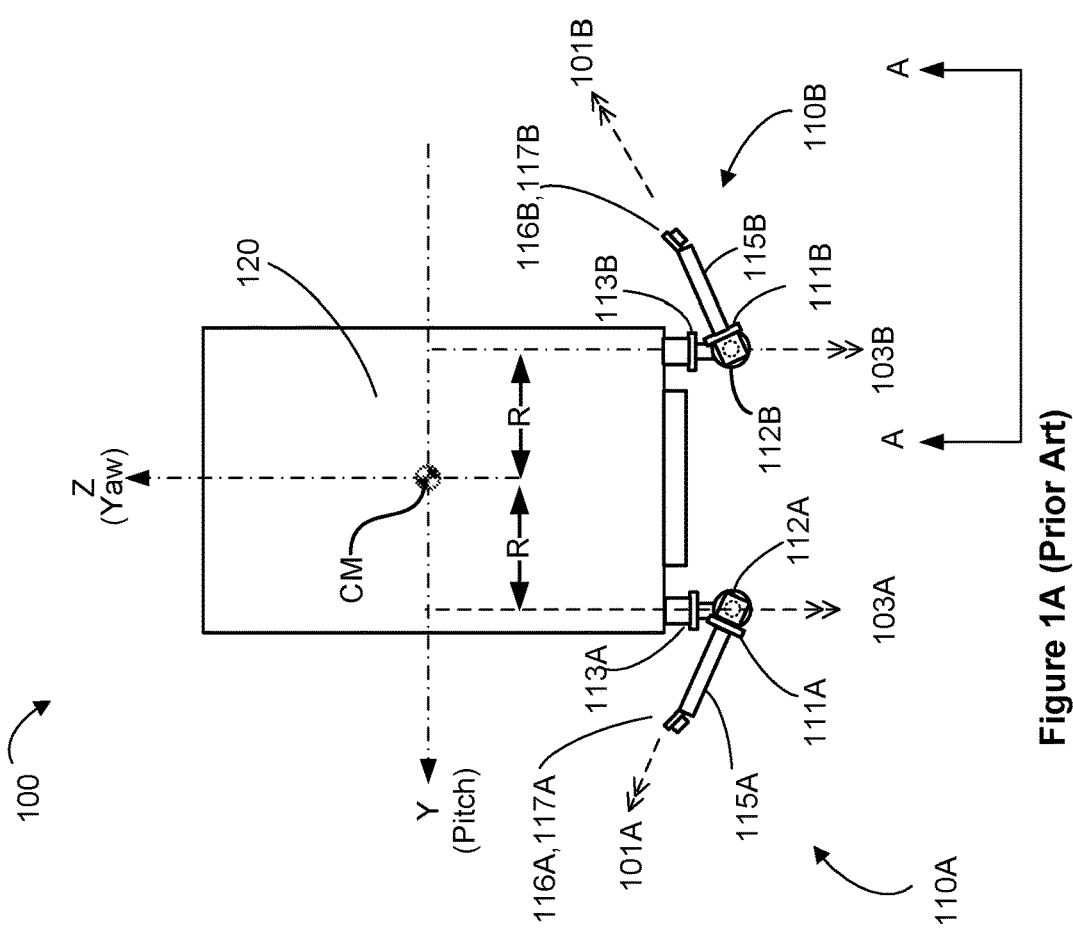
Figure 1A (Prior Art)

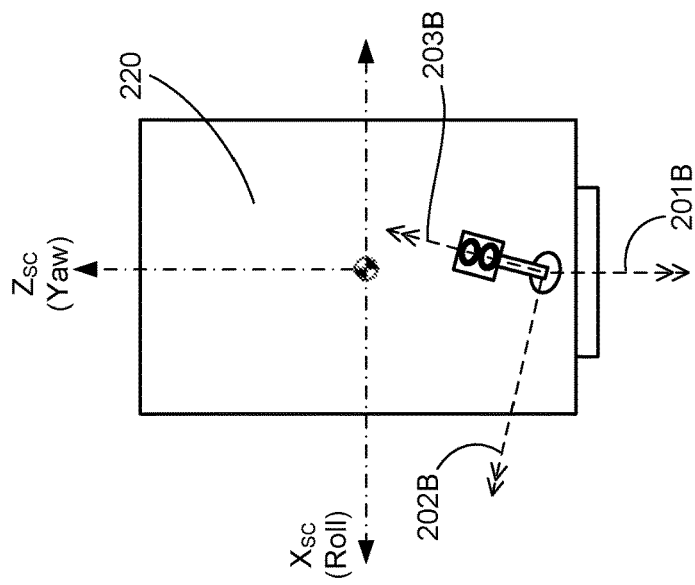
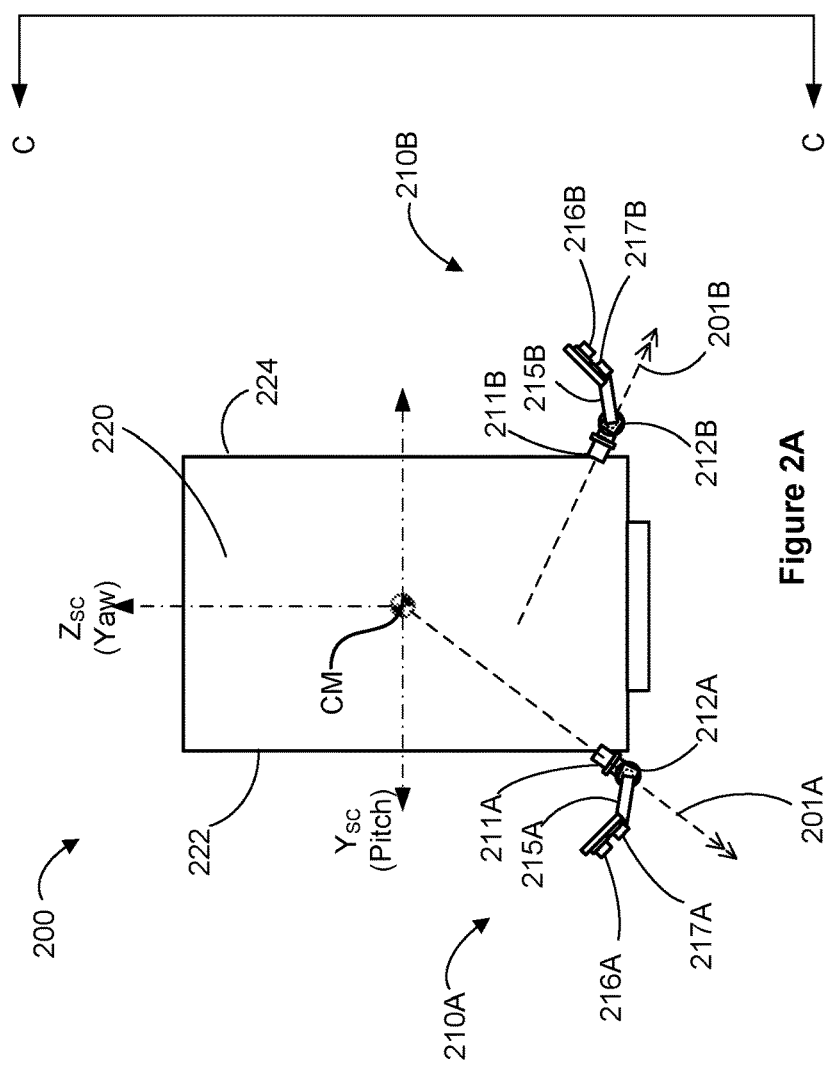

View DD

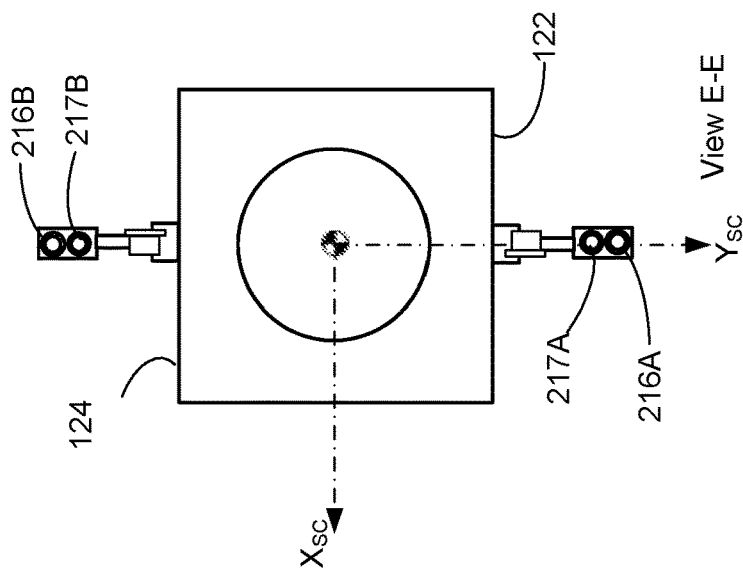
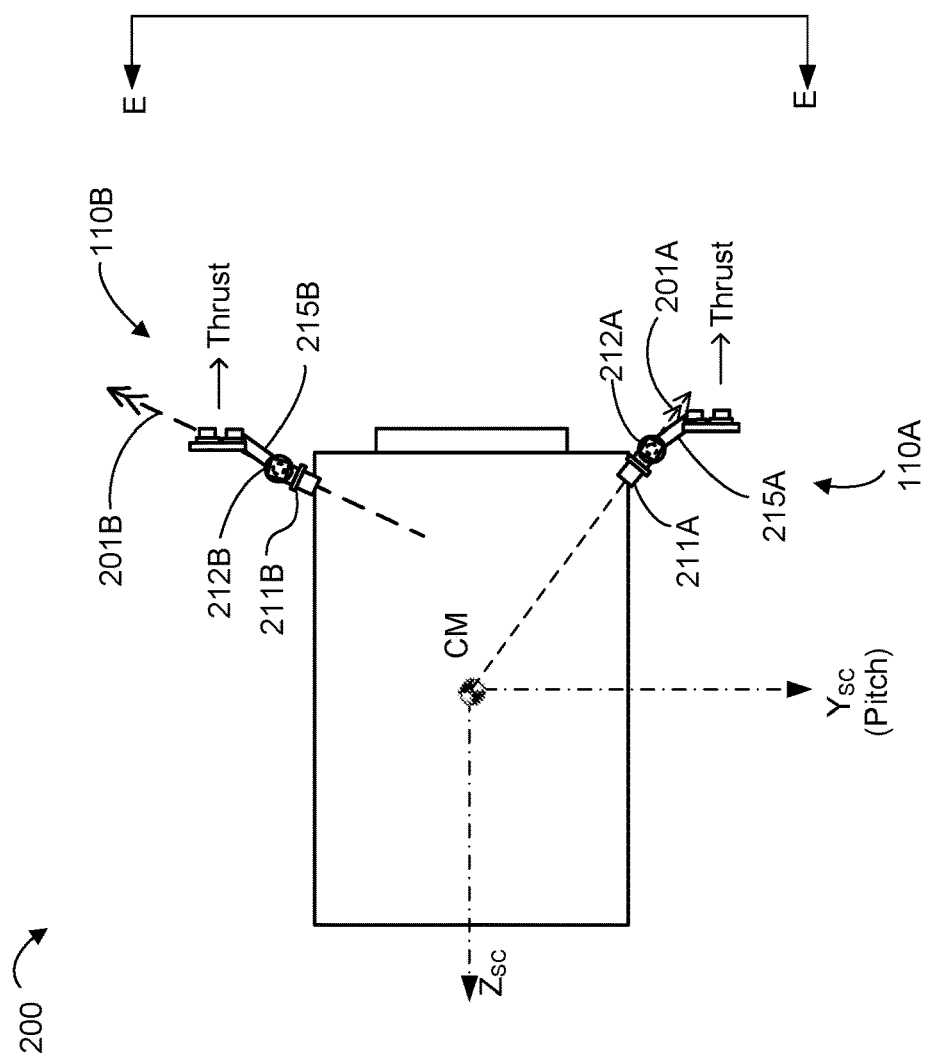
Figure 4A
Figure 4B

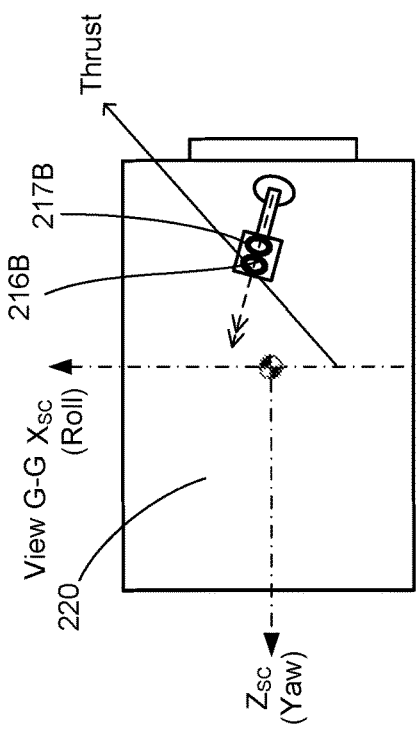
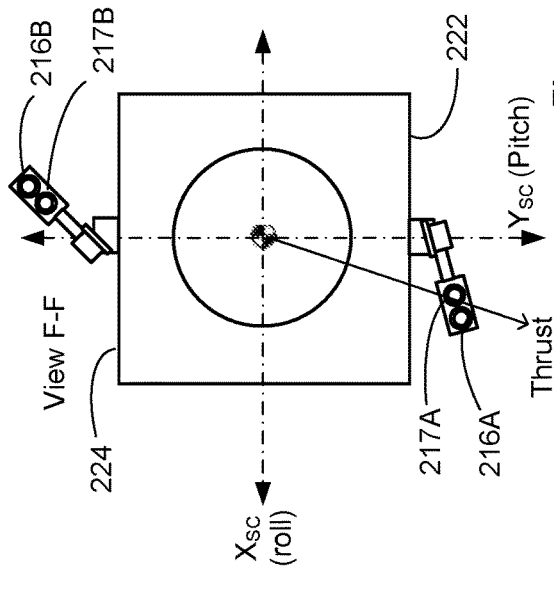
Figure 6A, Figure 6B, Figure 6C

US 10,464,694 B1

ASYMMETRIC THRUSTER GIMBAL CONFIGURATION

TECHNICAL FIELD

This invention relates generally to spacecraft and, in particular, to an asymmetric thruster gimbal configuration for an all-electric-propulsion spacecraft.

BACKGROUND

The assignee of the present invention manufactures and deploys spacecraft for commercial, defense and scientific missions.

Such spacecraft are equipped with on board propulsion systems, including chemical and/or electric thrusters, for orbit raising from a launch vehicle transfer orbit (or "parking orbit") to an operational orbit, for example, to a geosynchronous orbit; for stationkeeping once disposed in the operational orbit; and for attitude control/momentum management purposes.

The propulsion mission functions contemplated by the present disclosure, include, but are not limited to, momentum management and orbit control, orbit control including orbit raising, orbit lowering and stationkeeping (N-S and E-W) for geosynchronous and other Earth orbiting spacecraft. Typical requirements for such propulsion mission functions are described in detail in U.S. Pat. No. 6,032,904, assigned to the assignee of the present invention, and may be summarized as follows.

Orbit raising functions relate to the task of transferring a spacecraft from an initial lower orbit (into which the spacecraft has been injected by a launch vehicle) to, for example, an intermediate orbit or an operational orbit or from an operational orbit to a graveyard orbit. Where a liquid chemical thruster is the propulsion technology chosen for performing the orbit raising function, the mass of the chemical propellant needed for orbit raising can be as much as half of the spacecraft total mass injected into the initial orbit by the launch vehicle. Where an electric thruster system is used for part or all of the orbit raising function, a substantial mass savings may be achieved, by virtue of the electric thruster's higher specific impulse (Isp) however, significantly more time must be allocated to the orbit raising phase of the spacecraft's life, as a result of the electric thruster's lower thrust. Orbit lowering functions relate to the task of transferring a spacecraft from an initial higher orbit to a lower orbit.

Once in an operational orbit, the propulsion system is responsible for maintaining correct orbital position and attitude throughout the life of the spacecraft. For a geostationary spacecraft, for example, the correct orbital position always lies in the plane of the earth's equator, at a particular assigned longitude. Various forces act on the spacecraft which, in the absence of propulsion stationkeeping functions, tend to move the spacecraft out of the desired orbital position. These forces arise from several sources including the gravitational effects of the sun and moon, the elliptical shape of the earth, and solar radiation pressure. Stationkeeping includes control of the inclination, eccentricity, and drift of the spacecraft. The orbit's inclination relates to the north-south position of the spacecraft relative to the earth's equator and may be maintained at a value acceptably close to zero by performing periodic north-south stationkeeping (NSSK) maneuvers. Drift is a measure of the difference in longitude of the spacecraft's subsatellite point and the desired geostationary longitude as time progresses and may be corrected by performing periodic east-west stationkeeping (EWSK) maneuvers. Eccentricity is a measure of the noncircularity of the spacecraft orbit, and may be controlled in the course of performing NSSK and/or EWSK maneuvers, or separately.

Once on-station, a spacecraft must maintain its attitude in addition to its orbital position. Disturbance torques, such as solar pressure, work to produce undesired spacecraft attitude motion. Momentum wheel stabilization systems are commonly used to counteract such disturbance torques. Such systems typically include one or more momentum wheels and control loops to sense and control changes in the spacecraft attitude. The control loops determine the required speed of the wheels to absorb or off-load momentum based on a sensed spacecraft attitude. Momentum stored in the momentum wheels must be periodically unloaded, to keep the momentum wheels within a finite operable speed range. Momentum wheel unloading is typically accomplished by applying an external torque to the spacecraft by firing a thruster, a propulsion mission function referred to herein as momentum management.

In many instances, individual thrusters are relatively "specialized" with respect to the mission functions each thruster performs. For example, propulsion subsystems have been configured whereby electric thrusters perform north south stationkeeping and momentum management, but not orbit raising. As a further example, some propulsion subsystems have been configured whereby electric thrusters perform some orbit raising and/or north south stationkeeping, but separate chemical thrusters perform east-west stationkeeping and some orbit raising. Such a system is disclosed in U.S. Pat. No. 6,032,904, issued to Hosick (hereinafter, "Hosick") and assigned to the assignee of the present invention, the disclosure of which is hereby incorporated in its entirety into the present disclosure for all purposes. Additional stationkeeping and momentum management techniques are described in U.S. Pat. Nos. 4,767,084, 6,296,207, and U.S. Pat. Pub. 2014-0138491, assigned to the assignee of the present invention, the disclosures of which are incorporated by reference into the present application for all purposes.

In US Pat Pub 2016-0176545, owned by the assignee of the present invention, a propulsion system is disclosed that is capable of fulfilling all mission requirements for orbit raising/lowering, stationkeeping (N-S and E-W), and momentum management using thrusters mounted on two three-axis thruster support mechanisms (six actuators, total). As illustrated in FIGS. 1A-1D, a spacecraft 100 includes two symmetrically disposed thruster support mechanisms (TSMs) for providing three axis positioning and orientation of at least one thruster. Each TSM (110A and 110B) includes a respective elongated structural member ("boom") defining a respective longitudinal axis. More particularly, a longitudinal axis 101A of boom 115A and a longitudinal axis 101B of boom 115B are illustrated in FIGS. 1A-1D. Proximate to a distal end of each boom are disposed two thrusters, a primary thruster and a redundant thruster 117. More particularly, in the illustrated implementation, a primary thruster 116A and a secondary thruster 117A are disposed proximate to a distal end of boom 115A, whereas a primary thruster 116B and a secondary thruster 117B are disposed proximate to a distal end of boom 115B. The primary thruster and the redundant thruster may be fixedly coupled with a distal portion of the boom directly or by way of an intermediate structure (not illustrated) and/or radiator plate. A proximal portion of boom 115A and boom 115B may be coupled with a main body 120 of spacecraft 100 by way of a respective pointing arrangement, each respective pointing arrangement including three revolute joints. For example, in the illustrated implementation of the proximal portion of boom 115A is coupled with the main body 120 by way of a pointing arrangement that includes revolute joint 111A, revolute joint 112A, and revolute joint 113 A, whereas he proximal portion of boom 115B is coupled with the main body 120 by way of a pointing arrangement that includes revolute joint 111B, revolute joint 112B, and revolute joint 113B. Each revolute joint may be rotatably coupled to a respective actuator so as to be rotatable about a respective axis of rotation. More particularly, in the illustrated example, revolute joint 111A is rotatable about axis 101A (i.e., the longitudinal axis of boom 115A); revolute joint 113A is rotatable about an axis 103A (aligned parallel with the yaw axis of spacecraft 100); and revolute joint 112A is rotatable about an axis (unlabeled for clarity) that is orthogonal to each of axis 101A and axis 103A and to the plane defined by the yaw axis and the pitch axis. Similarly, in the illustrated implementation, revolute joint 111B is rotatable about axis 101B (i.e., the longitudinal axis of boom 115B); revolute joint 113B is rotatable about an axis 103B (aligned parallel with the yaw axis of spacecraft 100); and revolute joint 112B is rotatable about an axis 102B that is orthogonal to each of axis 101B and axis 103B and, in the illustrated configuration, to the Y-Z plane.

It may be observed that the TSMs 110A and 110B are disposed in a generally symmetrical arrangement on the spacecraft. For example, axes 103A and 103B are respectively parallel to each other and to the spacecraft Z (yaw) axis, and intersect the spacecraft pitch axis at approximately equal distances, "R", from the spacecraft nominal center of mass (CM).

Other known techniques for enabling a reduced number of electric thrusters to perform multiple mission functions include providing four two-axis gimbals (eight actuators).

Improved techniques are desirable to enable meeting the full gamut of propulsion mission with a reduced quantity of actuators.

SUMMARY

According to some implementations, a spacecraft includes a first thruster support mechanism (TSM), including a first pointing arrangement and a first elongated structural member, the first structural member having a long dimension defining a first structural member axis, a proximal portion of the first structural member being attached to the first pointing arrangement, a distal portion of the first structural member being fixed coupled with a first set of one or more thrusters. The spacecraft includes a second TSM, including a second pointing arrangement and a second elongated structural member, the second structural member having a long dimension defining a second structural member axis, a proximal portion of the second structural member being attached to the second pointing arrangement, a distal portion of the second structural member being fixed coupled with a second set of one or more thrusters. The first pointing arrangement is articulable only by way of a first revolute joint and a second revolute joint, the first revolute joint being rotatable about a first axis that is fixed with respect to the spacecraft and the second revolute joint being rotatable about a second axis, the second axis having a substantial component that is orthogonal to each of the first axis and the first structural member axis. The second pointing arrangement is articulable only by way of a third revolute joint and a fourth revolute joint, the third revolute joint being rotatable about a third axis that is fixed with respect to the spacecraft and the fourth revolute joint being rotatable about a fourth axis, the fourth axis having a substantial component that is orthogonal to each of the third axis and the second structural member axis. With respect to an orbital plane, in an on-orbit configuration, the spacecraft has a yaw axis disposed within the orbital plane and directed from a spacecraft coordinate system origin toward nadir, a pitch axis orthogonal to the orbital plane and passing through the spacecraft coordinate system origin, and a roll axis orthogonal to the pitch axis and the yaw axis and passing through the spacecraft coordinate system origin, the spacecraft coordinate system origin being located proximal to the spacecraft center of mass. The first axis and the third axis are asymmetrically arranged with respect to the spacecraft coordinate system origin.

In some examples, the first axis may be disposed so as to intersect the spacecraft coordinate system origin, and the third axis is disposed so as to avoid intersecting the spacecraft coordinate system origin.

In some examples, the first axis may be disposed so as to intersect the pitch axis at a location proximal to the spacecraft coordinate system origin, and the third axis is disposed so as to intersect the pitch axis at a location substantially distant from the spacecraft coordinate origin.

In some examples, the first revolute joint is proximate to a main body of the spacecraft, and the second revolute joint is disposed between the first revolute joint and the first TSM.

In some examples, the third revolute joint may be proximate to a main body of the spacecraft, and the fourth revolute joint is disposed between the first revolute joint and the second TSM.

In some examples, one or both of the first revolute joint and the third revolute joint may be proximate to an aft surface of a main body of the spacecraft. In some examples, at least one of the first revolute joint and the third revolute joint may be proximate to a north or south facing sidewall of the main body of the spacecraft.

In some examples, in a launch configuration, the first structural member and second structural member may be disposed proximate to and parallel with a respective sidewall of the spacecraft.

In some examples, one or both of the first set of thrusters and the second set of thrusters may include at least one electric thruster. In some examples, the first set of thrusters may include at least two electric thrusters arranged in a line that is approximately coplanar with the first structural member axis.

According to some implementations a method includes raising an orbit of a spacecraft, with at least one thruster disposed on the spacecraft and performing, with the at least one thruster, one or more of north-south stationkeeping, east-west stationkeeping, and momentum management. A first thruster support mechanism (TSM), including a first pointing arrangement and a first elongated structural member, the first structural member having a long dimension defining a first structural member axis, a proximal portion of the first structural member being attached to the first pointing arrangement, a distal portion of the first structural member being fixed coupled with a first set of one or more thrusters. A second TSM, including a second pointing arrangement and a second elongated structural member, the second structural member having a long dimension defining a second structural member axis, a proximal portion of the second structural member being attached to the second pointing arrangement, a distal portion of the second structural member being fixed coupled with a second set of one or more thrusters. The first pointing arrangement is articulable only by way of a first revolute joint and a second revolute joint, the first revolute joint being rotatable about a first axis that is fixed with respect to the spacecraft and the second revolute joint being rotatable about a second axis, the second axis having a substantial component that is orthogonal to each of the first axis and the first structural member axis. The second pointing arrangement is articulable only by way of a third revolute joint and a fourth revolute joint, the third revolute joint being rotatable about a third axis that is fixed with respect to the spacecraft and the fourth revolute joint being rotatable about a fourth axis, the fourth axis having a substantial component that is orthogonal to each of the third axis and the second structural member axis. With respect to an orbital plane, in an on-orbit configuration, the spacecraft has a yaw axis disposed within the orbital plane and directed from a spacecraft coordinate system origin toward nadir, a pitch axis orthogonal to the orbital plane and passing through the spacecraft coordinate system origin, and a roll axis orthogonal to the pitch axis and the yaw axis and passing through the spacecraft coordinate system origin, the spacecraft coordinate system origin being located proximal to the spacecraft center of mass. The first axis and the third axis are asymmetrically arranged with respect to the spacecraft coordinate system origin.

In some examples, the method may include articulating at least one of the first TSM and the second TSM from a first position and orientation to a second position and orientation, wherein, the raising the orbit occurs with the at least one TSM disposed in the first orientation and position, and the performing one or more of north-south stationkeeping, east-west stationkeeping, and momentum management occurs with the at least one TSM disposed in the second orientation and position.

In some examples, the first axis may be disposed so as to intersect the spacecraft coordinate system origin, and the third axis is disposed so as to avoid intersecting the spacecraft coordinate system origin.

In some examples, the first axis may be disposed so as to intersect the pitch axis at a location proximal to the spacecraft coordinate system origin, and the third axis is disposed so as to intersect the pitch axis at a location substantially distant from the spacecraft coordinate origin.

In some examples, the first revolute joint may be proximate to a main body of the spacecraft, the second revolute joint may be disposed between the first revolute joint and the first TSM, the third revolute joint may be proximate to a main body of the spacecraft, and the fourth revolute joint may be disposed between the first revolute joint and the second TSM.

In some examples, one or both of the first revolute joint and the third revolute joint may be proximate to an aft surface of a main body of the spacecraft. In some examples, at least one of the first revolute joint and the third revolute joint may be proximate to a north or south facing sidewall of the main body of the spacecraft.

In some examples, in a launch configuration, the first structural member and second structural member may be disposed proximate to and parallel with a respective sidewall of the spacecraft.

In some examples, one or both of the first set of thrusters and the second set of thrusters may include at least one electric thruster. In some examples, the first set of thrusters includes at least two electric thrusters arranged in a line that is approximately coplanar with the first structural member axis.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which:

FIGS. 1A-1D illustrate an example of a spacecraft, as deployed on orbit.

FIGS. 2A and 2B illustrate an example of a spacecraft, as deployed on-orbit, in accordance with an implementation in a launch configuration.

FIGS. 4A and 4B illustrate an example of the spacecraft arranged in an on-orbit configuration appropriate for an orbit raising maneuver, according to an implementation.

FIGS. 6A-6C illustrate an example of the spacecraft arranged in an on-orbit configuration appropriate for performing an east west stationkeeping (EWSK) maneuver and a pitch momentum management maneuver, according to an implementation.

Figure 1D:
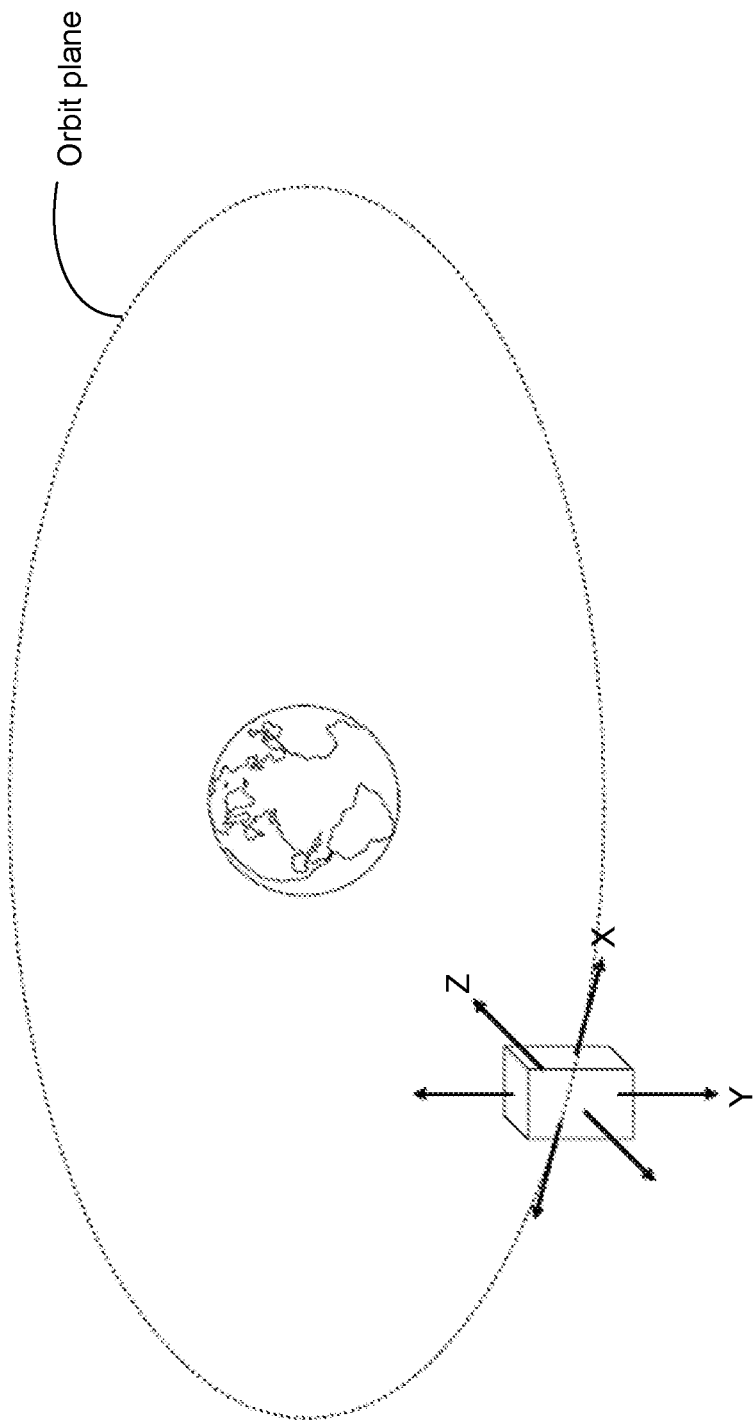

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

The terms "spacecraft", "satellite" and "vehicle" may be used interchangeably herein, and generally refer to any orbiting satellite or spacecraft system.

The presently disclosed techniques permit a propulsion system wherein a set of thrusters may be configured to perform multiple propulsion mission functions, including orbit raising/lowering, stationkeeping (N-S and E-W), and momentum management, with as few as two 2-degree of freedom (2-DOF) mechanisms. Thus, not more than four actuators are required. In some implementations, the propulsion system includes only electric thrusters that are configurable to perform all the above-mentioned functions. In some implementations, as few as four electric thrusters are configurable to perform all the above-mentioned functions. In some implementations, the four thrusters include two pairs of thrusters, each pair being fixedly coupled with a platform articulable by a two-axis gimbal.

An example implementation is illustrated in FIGS. 2A and 2B. In the illustrated implementation, a spacecraft 200 includes two 2-axis TSMs, TSM 210A and TSM 210B. In the illustrated implementation, the TSM 210A and the TSM 210B are configured such that a proximal portion of each TSM is disposed proximate to a respective sidewall of the spacecraft 200. More particularly, a proximal portion of the TSM 210A is disposed proximal to a sidewall 222 and a proximal portion of the TSM 210B is disposed proximal to a sidewall 224. It may be observed that, in the illustrated implementation, the respective sidewalls 222 and 224 are each substantially orthogonal to the spacecraft pitch axis. TSM 210A includes a boom 215A and TSM 210B includes a boom 215B. An arrangement of two thrusters is disposed proximate to a distal end of the each boom. More particularly, in the illustrated implementation, a primary thruster 216A and a secondary thruster 217A are disposed proximate to a distal end of boom 215A, whereas a primary thruster 216B and a secondary thruster 217B are disposed proximate to a distal end of boom 215B. The thrusters may be fixedly coupled with a distal portion of the boom by way of an intermediate structure (not illustrated). As used herein, and in the claims, "fixedly coupled" means that a coupling between a thruster, for example, between primary thruster 216B and boom 215B, is non-articulable, that is the coupling excludes any intermediate arrangement for articulating the thruster with respect to the boom. The "fixedly coupled" feature may include a rigid, semi-rigid, flexible, detachable and/or non-detachable mechanical joint between the thruster and the boom, with or without one or more intervening non-articulable elements disposed between the thruster and the boom. In the illustrated implementation, the thrusters are arranged in a line that is approximately coplanar with the respective structural member axis. That is, thrusters 216A and 217A are arranged in a line that is approximately coplanar with axis 201A, whereas thrusters 216B and 217B are arranged in a line that is approximately coplanar with axis 201B.

A proximal portion of each boom is coupled with a structural feature of spacecraft 200 by way of a pointing arrangement articulable by way of two revolute joints, each revolute joint being rotatably coupled to a respective actuator so as to be rotatable about a respective axis of rotation. More particularly, in the illustrated implementation, revolute joint 211B is rotatable about an axis 201B; and revolute joint 212B is rotatable about an axis 202B that is orthogonal to each of axis 201B and a longitudinal axis 203B, whereas revolute joint 211A is rotatable about an axis 201A and revolute joint 212A is rotatable about an axis (omitted for clarity of illustration) that is orthogonal to each of axis 201A and a longitudinal axis (omitted for clarity of illustration) of boom 215A.

In contrast to the arrangement described in connection with FIGS. 1A-1D above, the implementation illustrated in FIGS. 2A and 2B contemplate only two revolute joints per TSM. Moreover, Axis 201A and Axis 201B are configured to be asymmetric with respect to the spacecraft coordinate system. For example, it may be observed that Axis 201A passes through the CM of spacecraft 200 and that Axis 201B does not pass through the CM of spacecraft 200. Moreover, Axis 201A is disposed at a substantially less acute angle with respect to the spacecraft pitch axis than is Axis 201B.

As a result of the asymmetric arrangement, as will be explained in more detail hereinbelow, TSM 210A and TSM 210B may advantageously be directed towards different propulsion mission functions. For example, in the illustrated implementation, thruster 216A and/or thruster 217A of TSM 210A may perform most or all of EWSK. Because Axis 201A passes through or proximate to the spacecraft center of mass, actuation of thrusters disposed on TSM 210A may create a significant East-West thrust vector with a very small pitch momentum component. On the other hand, thruster 216B and/or thruster 217B of TSM 210B may advantageously be selected to perform pitch momentum control. Since inertial and body-fixed pitch axes are parallel, pitch momentum can be controlled at any orbital true anomaly. TSM 210B may also impart a residual East-West delta-V.

As a result of the asymmetric arrangement, pitch momentum control and EWSK may be independently controlled, and neither TSM is required to include more than two revolute joints.

Referring again to FIGS. 2A and 2B, the illustrated spacecraft 200 includes two TSMs, each of TSM 210A and TSM 210 B being configured in an example of a deployed (or "on-orbit") configuration.

Figure 3B:
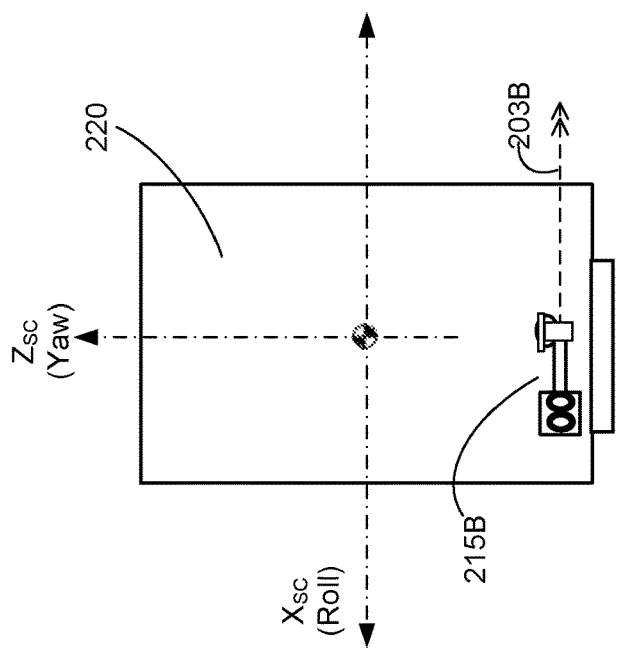
FIGS. 3A and 3B illustrate an example of a spacecraft, in a launch configuration, in accordance with an implementation.
Figure 3A:
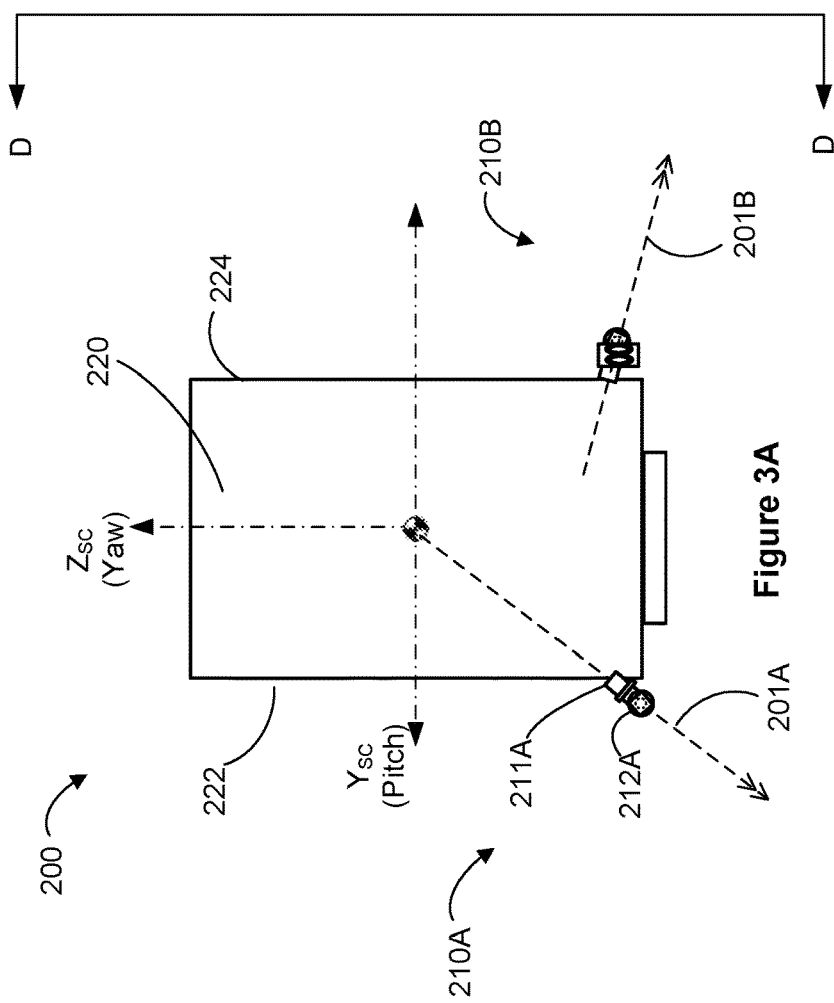

Referring now to FIGS. 3A and 3B, the spacecraft 200 is illustrated in an example of a launch configuration. In the illustrated launch configuration, each of TSM 210A and TSM 210 B is disposed ("stowed") generally parallel with and proximate to respective sidewalls of the spacecraft main body 220. More particularly, the TSM 210A is disposed proximate to sidewall 222 and TSM 210B is disposed proximate to sidewall 224. In some implementations, the side walls 222 and 224 may be disposed, in the launch configuration, parallel to a longitudinal axis of the launch vehicle. In some implementations, the side walls 222 and 224 may, in the on-orbit configuration, be disposed in north-south facing direction. It will be appreciated that, by appropriate rotation of revolute joints 211A and 212A, the TSM 210A may be reconfigured from the stowed arrangement illustrated in FIGS. 3A and 3B to the deployed arrangement illustrated in FIGS. 2A and 2B. Similarly, by appropriate rotation of revolute joints 211B and 212B, the TSM 210B may be reconfigured from the stowed arrangement illustrated in FIGS. 3A and 3B to the deployed arrangement illustrated in FIGS. 2A and 2B.

Referring now to FIGS. 4A and 4B, the spacecraft 200 is illustrated in an example of an on-orbit configuration appropriate for an orbit raising maneuver. In the illustrated implementation, each of TSM 210A and TSM 210B has been deployed to an orientation such that a thrust vector of at least one thruster is substantially aligned with the spacecraft Z-axis. It will be appreciated that the spacecraft Z-axis during the orbit raising maneuver may be substantially aligned with the spacecraft velocity vector. The spacecraft y-axis ($Y_{SC}$) is ordinarily aligned orthogonal to the plane of the orbit, (e.g., in a substantially north-south direction). The spacecraft x-axis ($X_{SC}$) is orthogonal to $Z_{SC}$ and $Y_{SC}$ and may be approximately directed, during the orbit raising maneuver, to pass through nadir. It is contemplated that a substantially simultaneous firing of one or more thruster pairs may increase spacecraft velocity along the Z axis. Simultaneous firing of a thruster pair may include, for example firing thruster 216A and 216B together. In some implementations, two or more pairs of thrusters may be simultaneously fired. Where each thruster in the thruster pair has a similar thrust magnitude and moment arm with respect to the spacecraft CM, disturbance torques generated by such simultaneous firing will generally be small. The disturbance torques may be further minimized by appropriate throttling or duty cycling of the thrusters and/or by adjusting thrust vector orientation by adjusting a rotation angle of one or more of revolute joints 211 and 212.

Figure 5:
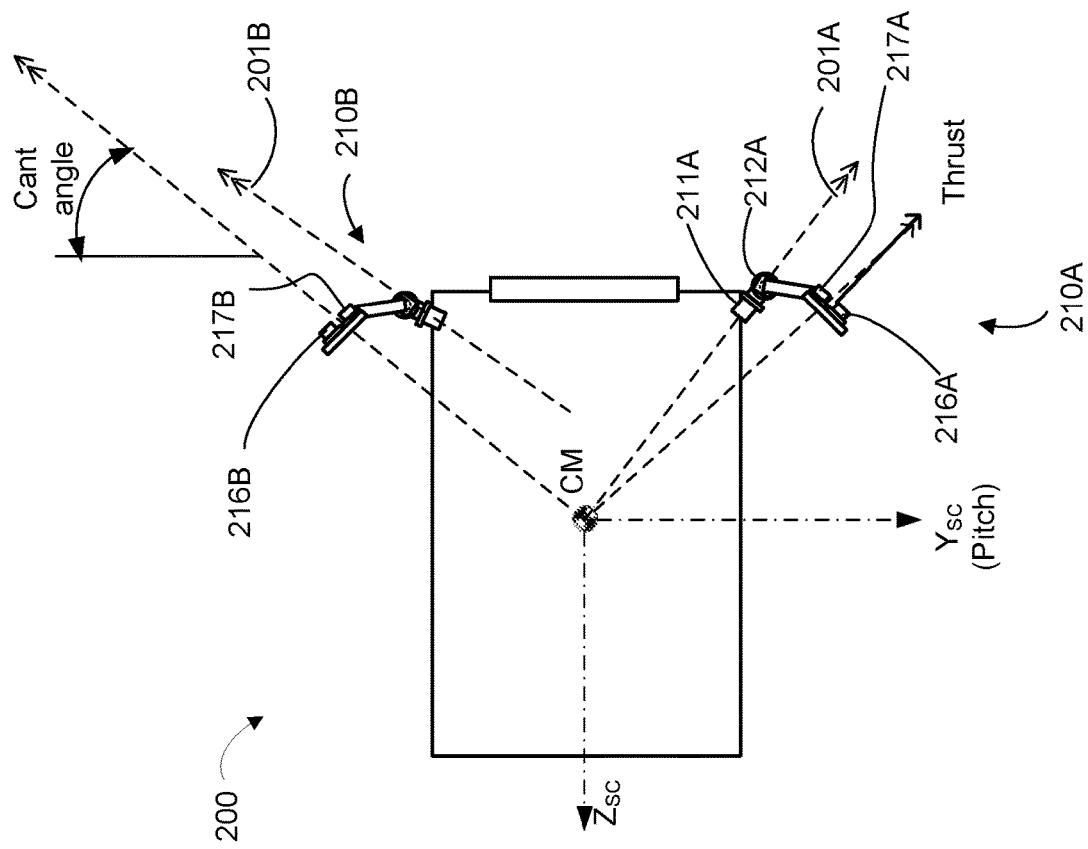
FIG. 5 illustrates an example of the spacecraft arranged in an on-orbit configuration appropriate for performing a north south stationkeeping (NSSK) maneuver, according to an implementation.

FIG. 5 illustrates an example of the spacecraft 100 arranged in an on-orbit configuration appropriate for performing an NSSK maneuver. In the illustrated implementation, each of TSM 210A and TSM 210B has been deployed to an orientation such that a thrust vector of at least one thruster is substantially aligned with the CM of spacecraft 200 and has a substantial component in the north-south (Y) direction. With respect to a conventional spacecraft coordinate system having an origin approximately coincident with the CM of the spacecraft 200, it will be appreciated that, during such stationkeeping maneuvers, $Z_{SC}$ (or "yaw" axis) is ordinarily aligned along an orbit radius. The $Y_{SC}$ (or "pitch" axis) is ordinarily aligned orthogonal to the plane of the orbit, (i.e., in a north-south direction). The spacecraft x-axis, not illustrated, is orthogonal to $Z_{SC}$ and $Y_{SC}$, substantially aligned with the spacecraft velocity vector, and may be said to be aligned in an east-west direction.

In some implementations, a NSSK maneuver may be performed by firing one or both of thrusters 216A and 217A, such that a resultant thrust vector passes through the CM of spacecraft 200. It may be observed that the thrust vector has a component of thrust in both the north-south direction and the radial direction. For a geostationary satellite, NSSK maneuvers may ordinarily be performed at opposite sides of the orbit separated by 180° of orbital arc (12 hours). Accordingly, in some implementations, a nominal NSSK maneuver strategy may contemplate a firing of one or both of thrusters 216A and 217A at a first orbital location, followed by firing of one or both of thrusters 216B and 217B at an orbital location approximately 180° from the first. For example, NSSK maneuvers may be executed at locations 90° and 270° from the orbit's right ascension of ascending node (RAAN). As a result of executing such a maneuver strategy, an increase in orbital eccentricity caused by a thrust vector component in the radial direction may be controlled by adjusting the relative on times of the north and south module firings as well as the time between the firings. Appropriate selection of relative on-times and orbital positions of successive burns may produce a ΔV having a direction and magnitude required for eccentricity control. In some implementations, eccentricity produced by a thrust component in a first radial direction during a first firing may be offset by an approximately equal and opposite thrust component resulting from a second firing.

Inertial Roll-Yaw momentum control may be achieved by appropriate rotation of revolute joints 211A and 212A, 211B and/or 212B so as to offset respective thrust vectors of thruster 216A, 217A, 216B and/or 217B from the CM and create a body-fixed Roll torque. During portions of the year, there will be poor alignment of the body fixed roll axis with the orientation of the R-Y momentum vector. During these periods, the inclination burn may be split into paired burns near, but not exactly at, the optimal burn locations 90° and 270° from the orbit's right ascension of ascending node (RAAN). One of the two burns will then have a more favorable alignment of body fixed Roll to the inertial R-Y momentum vector. Small deviations from the optimal burn position are needed, so the cosine efficiency loss of the inclination maneuver is very small.

As indicated above, the TSM 210A and TSM 210B may advantageously be directed towards different propulsion mission functions. For example, because Axis 201A and Axis 201B are asymmetrically arranged, Pitch momentum and East-West delta-V may be independently controlled by different thrusters. Referring now to FIGS. 6A-6C, in the illustrated implementation, the TSM 210A is depicted as having been rotated about axis 201A, such that a firing of thruster 216A and/or thruster 217A produces a thrust vector through or very close to the CM of spacecraft 200, the thrust vector having a substantial component parallel to $X_{SC}$. As a result, east-west ΔV may be produced while avoiding significant disturbance torques. Thus thrusters disposed on the TSM 210A may, advantageously, perform most or all of EWSK.

On the other hand, thruster 216B and/or thruster 217B of TSM 210B may advantageously be selected to perform pitch momentum control. Since inertial and body-fixed pitch axes are parallel, pitch momentum can be controlled at any orbital true anomaly. TSM 210B may also impart a residual East-West delta-V.

Advantageously, the two thrusters on each module may be oriented in nearly the same orientation such that loss of a thruster does not impact the maneuver efficiency. More particularly, thruster 216A and 217A may be oriented on the distal portion of the boom 215A in nearly the same orientation. Similarly, thruster 216B and 217B may be oriented on the distal portion of the boom 215B in nearly the same orientation.

Figure 7:
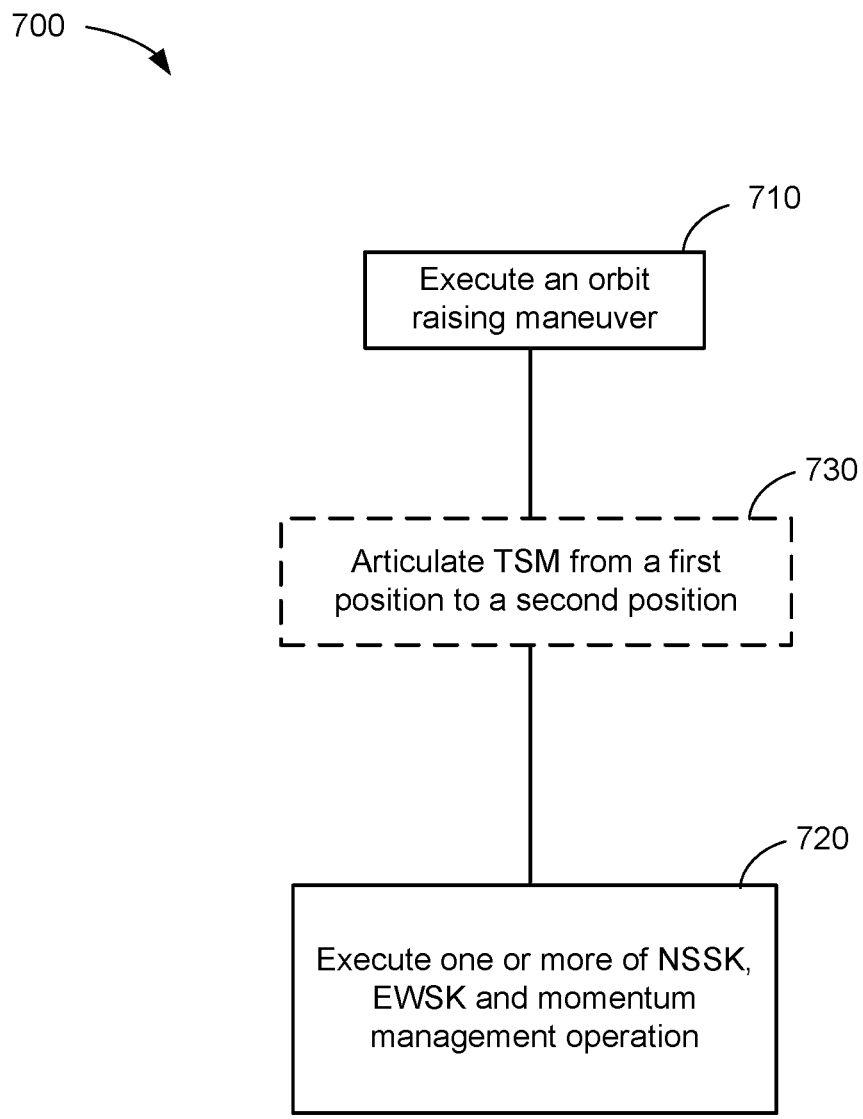
FIG. 7 illustrates a method for performing orbit raising, stationkeeping and momentum management for a spacecraft, according to an implementation.

Referring now to FIG. 7, a method 700 of performing orbit raising, stationkeeping and momentum management for a spacecraft is illustrated. The method 700 may begin, at block 710 with raising an orbit of the spacecraft, using at least one thruster disposed on the spacecraft. At block 720, one or more of north-south stationkeeping, east-west stationkeeping, and momentum management may be performed with the thrusters. As described hereinabove, the spacecraft includes a first TSM and a second TSM. The first TSM may include a first pointing arrangement and a first elongated structural member, the first structural member having a long dimension defining a first structural member axis, a proximal portion of the first structural member being attached to the first pointing arrangement, a distal portion of the first structural member being fixed coupled with a first set of one or more thrusters. The second TSM may include a second pointing arrangement and a second elongated structural member, the second structural member having a long dimension defining a second structural member axis, a proximal portion of the second structural member being attached to the second pointing arrangement, a distal portion of the second structural member being fixed coupled with a second set of one or more thrusters. The first pointing arrangement may be articulable only by way of a first revolute joint and a second revolute joint, the first revolute joint being rotatable about a first axis that is fixed with respect to the spacecraft, and the second pointing arrangement may be articulable only by way of a third revolute joint and a fourth revolute joint, the third revolute joint being rotatable about a third axis that is fixed with respect to the spacecraft, where the first axis and the fourth axis are asymmetrically arranged with respect to the spacecraft coordinate system origin.

In some implementations, the method 700 further includes articulating the TSM from a first position and orientation to a second position and orientation, block 730. Raising the orbit occurs with the TSM disposed in the first orientation and position and the performing one or more of north-south stationkeeping, east-west stationkeeping, and momentum management occurs with the TSM disposed in the second orientation.

Thus, techniques for performing multiple mission functions with a reduced quantity of actuators have been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A spacecraft comprising:
a first thruster support mechanism (TSM), including a first pointing arrangement and a first elongated structural member, the first structural member having a long dimension defining a first structural member axis, a proximal portion of the first structural member being attached to the first pointing arrangement, a distal portion of the first structural member being fixed coupled with a first set of one or more thrusters; and
a second TSM, including a second pointing arrangement and a second elongated structural member, the second structural member having a long dimension defining a second structural member axis, a proximal portion of the second structural member being attached to the second pointing arrangement, a distal portion of the second structural member being fixed coupled with a second set of one or more thrusters; wherein
the first pointing arrangement is articulable only by way of a first revolute joint and a second revolute joint, the first revolute joint being rotatable about a first axis that is fixed with respect to the spacecraft and the second revolute joint being rotatable about a second axis, the second axis having a substantial component that is orthogonal to each of the first axis and the first structural member axis;
the second pointing arrangement is articulable only by way of a third revolute joint and a fourth revolute joint, the third revolute joint being rotatable about a third axis that is fixed with respect to the spacecraft and the fourth revolute joint being rotatable about a fourth axis, the fourth axis having a substantial component that is orthogonal to each of the third axis and the second structural member axis;
with respect to an orbital plane, in an on-orbit configuration, the spacecraft has a yaw axis disposed within the orbital plane and directed from a spacecraft coordinate system origin toward nadir, a pitch axis orthogonal to the orbital plane and passing through the spacecraft coordinate system origin, and a roll axis orthogonal to the pitch axis and the yaw axis and passing through the spacecraft coordinate system origin, the spacecraft coordinate system origin being located proximal to the spacecraft center of mass;
the first axis and the third axis are asymmetrically arranged with respect to the spacecraft coordinate system origin; and
the first axis and the third axis are each disposed at an acute angle to the spacecraft pitch axis such that the acute angle of the first axis is less than the acute angle of the third axis.

2. The spacecraft of claim 1, wherein the first axis is disposed so as to intersect the spacecraft coordinate system origin, and the third axis is disposed so as to not intersect the spacecraft coordinate system origin.

3. The spacecraft of claim 1, wherein the first axis is disposed so as to intersect the pitch axis at a location proximal to the spacecraft coordinate system origin, and the third axis is disposed so as to intersect the pitch axis at a location that is not at the spacecraft coordinate system origin.

4. The spacecraft of claim 1, wherein the first revolute joint is proximate to a main body of the spacecraft, and the second revolute joint is disposed between the first revolute joint and the first TSM.

5. The spacecraft of claim 1, wherein the third revolute joint is proximate to a main body of the spacecraft, and the fourth revolute joint is disposed between the first revolute joint and the second TSM.

6. The spacecraft of claim 1, wherein one or both of the first revolute joint and the third revolute joint is proximate to an aft surface of a main body of the spacecraft.

7. The spacecraft of claim 6, wherein the main body of the spacecraft comprises north and south facing sidewalls, and wherein at least one of the first revolute joint and the third revolute joint is proximate to the north or south facing sidewall of the main of the spacecraft.

8. The spacecraft of claim 1, wherein, in a launch configuration, the first structural member and second structural member are disposed proximate to and parallel with a respective sidewall of the spacecraft.

9. The spacecraft of claim 1, wherein one or both of the first set of thrusters and the second set of thrusters includes at least one electric thruster.

10. The spacecraft of claim 9, wherein the first set of thrusters includes at least two electric thrusters arranged in a line that is substantially coplanar with the first structural member axis.

11. A method comprising:
raising an orbit of a spacecraft; and
performing one or more of north-south stationkeeping, east-west stationkeeping, and momentum management; wherein:
a first thruster support mechanism (TSM), including a first pointing arrangement and a first elongated structural member, the first structural member having a long dimension defining a first structural member axis, a proximal portion of the first structural member being attached to the first pointing arrangement, a distal portion of the first structural member being fixed coupled with a first set of one or more thrusters; and
a second TSM, including a second pointing arrangement and a second elongated structural member, the second structural member having a long dimension defining a second structural member axis, a proximal portion of the second structural member being attached to the second pointing arrangement, a distal portion of the second structural member being fixed coupled with a second set of one or more thrusters; wherein
the first pointing arrangement is articulable only by way of a first revolute joint and a second revolute joint, the first revolute joint being rotatable about a first axis that is fixed with respect to the spacecraft and the second revolute joint being rotatable about a second axis, the second axis having a substantial component that is orthogonal to each of the first axis and the first structural member axis;
the second pointing arrangement is articulable only by way of a third revolute joint and a fourth revolute joint, the third revolute joint being rotatable about a third axis that is fixed with respect to the spacecraft and the fourth revolute joint being rotatable about a fourth axis, the fourth axis having a substantial component that is orthogonal to each of the third axis and the second structural member axis;
with respect to an orbital plane, in an on-orbit configuration, the spacecraft has a yaw axis disposed within the orbital plane and directed from a spacecraft coordinate system origin toward nadir, a pitch axis orthogonal to the orbital plane and passing through the spacecraft coordinate system origin, and a roll axis orthogonal to the pitch axis and the yaw axis and passing through the spacecraft coordinate system origin, the spacecraft coordinate system origin being located proximal to the spacecraft center of mass;

the first axis and the third axis are asymmetrically arranged with respect to the spacecraft coordinate system origin; and the first axis and the third axis are each disposed at an acute angle to the spacecraft pitch axis such that the acute angle of the first axis is less than the acute angle of the third axis.

12. The method of claim 11, further comprising:

articulating at least one of the first TSM and the second TSM from a first position and orientation to a second position and orientation, wherein, the raising the orbit occurs with the at least one TSM disposed in the first orientation and position, and the performing one or more of north-south stationkeeping, east-west stationkeeping, and momentum management occurs with the at least one TSM disposed in the second orientation and position.

13. The method of claim 11, wherein the first axis is disposed so as to intersect the spacecraft coordinate system origin, and the third axis is disposed so as to not intersect the spacecraft coordinate system origin.

14. The method of claim 11, wherein the first axis is disposed so as to intersect the pitch axis at a location proximal to the spacecraft coordinate system origin, and the third axis is disposed so as to intersect the pitch axis at location that is not at the spacecraft coordinate origin.

15. The method of claim 11, wherein:

the first revolute joint is proximate to a main body of the spacecraft;

the second revolute joint is disposed between the first revolute joint and the first TSM;

the third revolute joint is proximate to a main body of the spacecraft, and the fourth revolute joint is disposed between the first revolute joint and the second TSM.

16. The method of claim 11, wherein one or both of the first revolute joint and the third revolute joint is proximate to an aft surface of a main body of the spacecraft.

17. The method of claim 16, wherein the main body of the spacecraft comprises north and south facing sidewalls, and wherein at least one of the first revolute joint and the third revolute joint is proximate to the north or south facing sidewall of the main body of the spacecraft.

18. The method of claim 11, wherein, in a launch configuration, the first structural member and second structural member are disposed proximate to and parallel with a respective sidewall of the spacecraft.

19. The method of claim 11, wherein one or both of the first set of thrusters and the second set of thrusters includes at least one electric thruster.

20. The method of claim 19, wherein the first set of thrusters includes at least two electric thrusters arranged in a line that is substantially coplanar with the first structural member axis.

\* \* \* \* \*